(12) United States Patent
Yamanaka

(10) Patent No.: US 7,196,827 B2
(45) Date of Patent: Mar. 27, 2007

(54) IMAGE READING APPARATUS AND IMAGE FORMING APPARATUS

(75) Inventor: Yuji Yamanaka, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1006 days.

(21) Appl. No.: 10/310,054

(22) Filed: Dec. 5, 2002

(65) Prior Publication Data

US 2003/0117673 A1  Jun. 26, 2003

(30) Foreign Application Priority Data

Dec. 21, 2001  (JP) .............................. 2001-388846

(51) Int. Cl.
*H04N 1/04* (2006.01)
(52) U.S. Cl. ...................... 358/496; 358/498; 399/367
(58) Field of Classification Search ................ 358/496, 358/498, 474, 505, 401, 501, 488; 399/364, 399/367, 374, 377, 206; 355/23, 24, 75
See application file for complete search history.

(56) References Cited

U.S. PATENT DOCUMENTS

| 5,101,284 A | 3/1992 | Tanabe ...................... 358/461 |
| 5,300,998 A | 4/1994 | Ogisawa et al. ............ 399/124 |
| 5,365,321 A | 11/1994 | Koshimizu et al. ......... 399/329 |
| 5,606,430 A | 2/1997 | Morikawa et al. .......... 358/498 |
| 5,680,203 A * | 10/1997 | Kobayashi et al. ............ 355/76 |
| 6,178,012 B1 | 1/2001 | Larkin et al. ................ 358/474 |
| 6,254,078 B1 * | 7/2001 | Taruki ........................ 271/3.01 |
| 2002/0086786 A1 | 7/2002 | Kamizuru et al. ........... 493/405 |
| 2004/0165227 A1 * | 8/2004 | Makino et al. .............. 358/474 |
| 2005/0128536 A1 * | 6/2005 | Yamanaka et al. ........... 358/488 |
| 2005/0163546 A1 * | 7/2005 | Kim ............................ 399/367 |
| 2006/0013627 A1 * | 1/2006 | Choi ........................... 399/367 |

FOREIGN PATENT DOCUMENTS

| CN | 1241266 A | 1/2000 |
| CN | 1316156 A | 10/2001 |
| EP | 0 918 249 A1 | 5/1999 |
| EP | 0 962 810 A1 | 12/1999 |
| JP | 9-307695 | 11/1997 |
| JP | 10-93760 | 4/1998 |
| JP | 11-258869 | 9/1999 |
| JP | 2003-92662 | 3/2003 |

* cited by examiner

*Primary Examiner*—Cheukfan Lee
(74) *Attorney, Agent, or Firm*—Fitzpatrick, Cella, Harper & Scinto

(57) ABSTRACT

An image reading apparatus is capable of preventing generation of a streaked image or the like while maintaining the requisite precision level for the original reading position. The image reading apparatus includes a lead roller for supplying an original, a platen glass plate receiving the original supplied from the lead roller, a charge-coupled device (CCD) for reading an image formed on the original supplied onto the platen glass plate, and a lead delivery roller for delivering the original after the reading of the image, in which there are provided between the lead roller and the lead delivery roller a plurality of platen rollers adapted to guide the original so as to keep it at a predetermined distance from the platen glass plate.

6 Claims, 14 Drawing Sheets

IMAGE READING APPARATUS AND IMAGE FORMING APPARATUS

BACKGROUND OF THE INVENTION

1. Field of the Invention

The present invention relates to an image reading apparatus for reading the images of originals and to an image forming apparatus having the image reading apparatus.

2. Related Background Art

Conventionally, there has been available an image forming apparatus such as a digital copying machine which is equipped with an original feeder (hereinafter referred to as ADF (auto document feeder)) such as a duplex auto original feeder. In a digital copying machine equipped with an ADF, when an original in the ADF is to be copied, a reading apparatus provided below the ADF is moved to a set position, i.e., a position directly below a platen roller in the ADF, by a motor, and the apparatus is held at the position. Then light is emitted from a lamp unit, the original being transported between the platen roller and a platen glass plate to be thereby scanned, and the reflected light from the original being detected by the reading apparatus. Thereafter, processing is performed in a printer portion on the basis of the detected data, thereby obtaining a copied image.

As shown in FIGS. 14A, 14B, and 14C, an image reading portion of an ADF is composed of a platen roller 224, an upstream side transport roller 222, and a delivery side transport roller 223. When transporting an original, it is necessary to transport the original between the platen glass plate and the platen roller 224 at a constant speed and along the platen glass plate.

However, as can be seen from FIG. 14A, as the reading position is deviated from the position directly below the platen roller 224, the gap between the platen glass plate and the platen roller 224 is enlarged, and the original is raised from the platen glass plate under the influence of the rollers and guides on the upstream and downstream sides, resulting in unintended generation of a blurred image, or a fogged image, blank image, etc. due to variation in light quantity.

Further, as shown in FIG. 14B, at the instant that the trailing edge of the original leaves the guide, the original attitude is changed from the round state to the horizontal state, resulting in unwanted generation of a blurred image, or a fogged image, blank image, etc. due to variation in light quantity.

Further, as shown in FIG. 14C, before and after the leading edge of the original passes a jump stand for guiding the original to the delivery side transport roller 223, the original attitude is changed, resulting in undesired generation of a blurred image, or a fogged image, blank image, etc. due to variation in light quantity.

Further, in the ADF, it can happen that toner, ink or the like adhering to the surface of the original being transported is separated therefrom, and accumulated on the platen glass plate. When the dust thus accumulated exists directly above the original reading position, the dust may be taken for an image, with the result that it is erroneously recognized and read as a streaked image.

Since the gap between the platen glass plate and the original is kept minimum by the platen roller 224, the accumulated dust can be automatically removed by being rubbed away by the original being transported (self-cleaning effect). The nearer the position directly below the platen roller, the more remarkable becomes this self-cleaning effect. Thus, it is necessary to set the reading position directly below the platen roller. However, this is hard to realize due to insufficiency in the precision in parts and the precision in the original reading position, and a streaked image as mentioned above can be generated in the image while it is read at a position away from the platen roller 224.

SUMMARY OF THE INVENTION

Therefore, an object of the present invention is to prevent generation of a streaked image or the like while maintaining the requisite precision level for the original reading position.

In order to attain the above-mentioned object of the invention, according to an exemplary structure of the present invention, an image reading apparatus includes: a supply rotary member for supplying an original; an original receiving member for receiving the original supplied from the supply rotary member; image reading means for reading an image formed on the original supplied onto the original receiving member; and a delivery rotary member for delivering the original after the reading of the image, in which there are provided between the supply rotary member and the delivery rotary member a plurality of guide rotary members adapted to guide the original while keeping it spaced apart from the original receiving member by a predetermined distance.

DETAILED DESCRIPTION OF THE PREFERRED EMBODIMENTS

Embodiment

Figure 1:
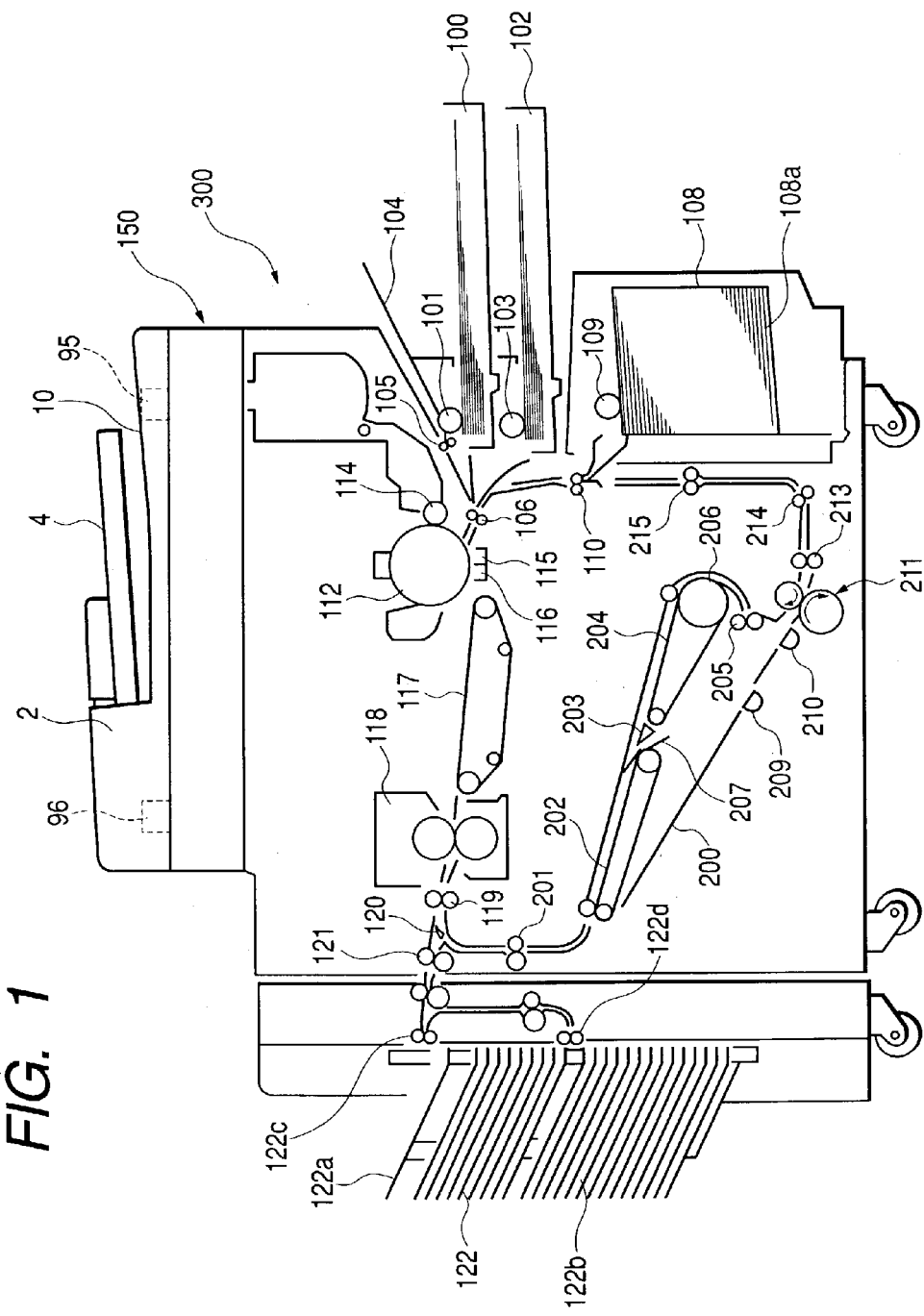
FIG. 1 is a schematic diagram showing the construction of an image forming apparatus.
Figure 2:
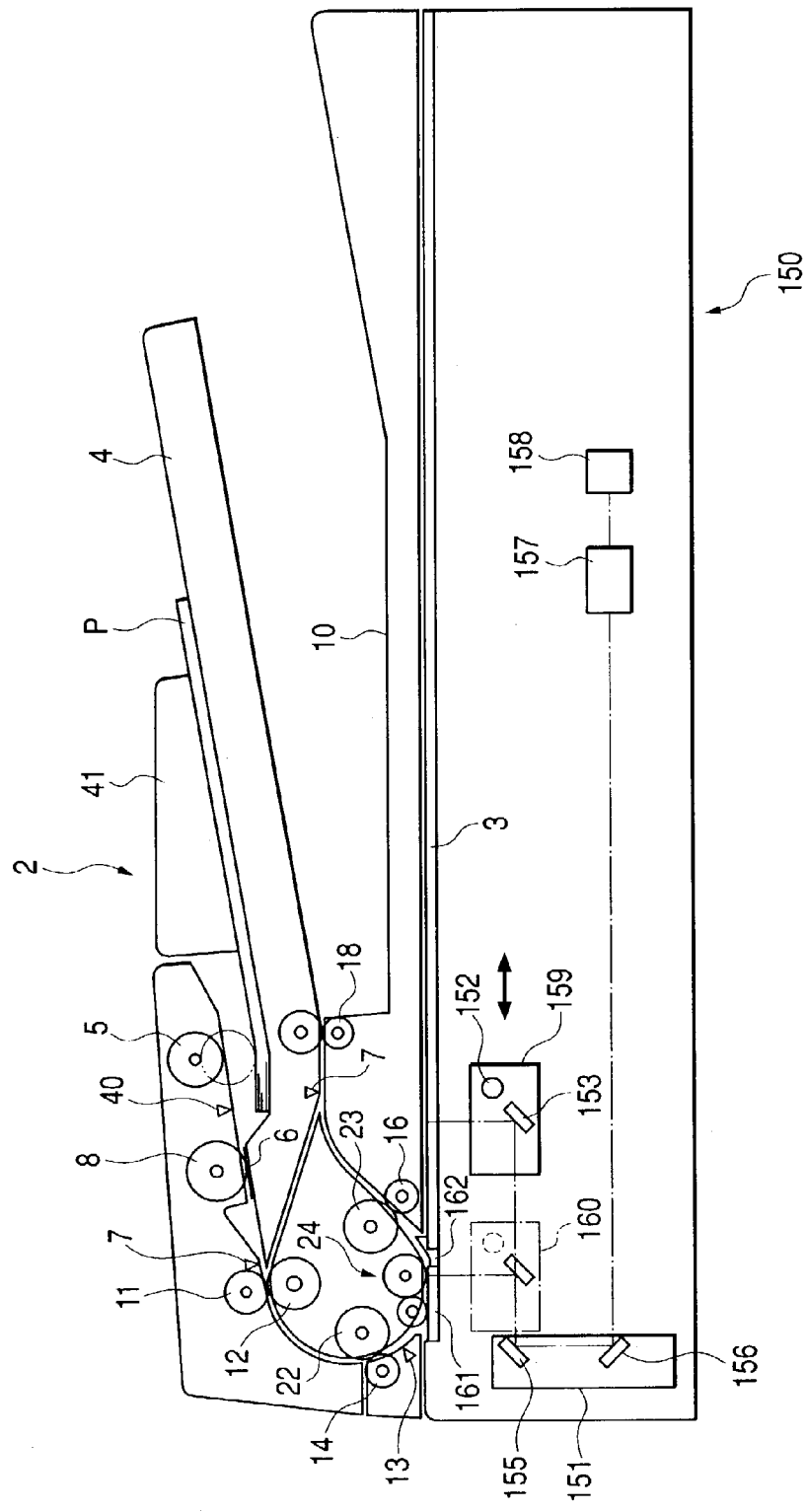
FIG. 2 is a schematic diagram showing the construction of an image reading apparatus.
Figure 3:
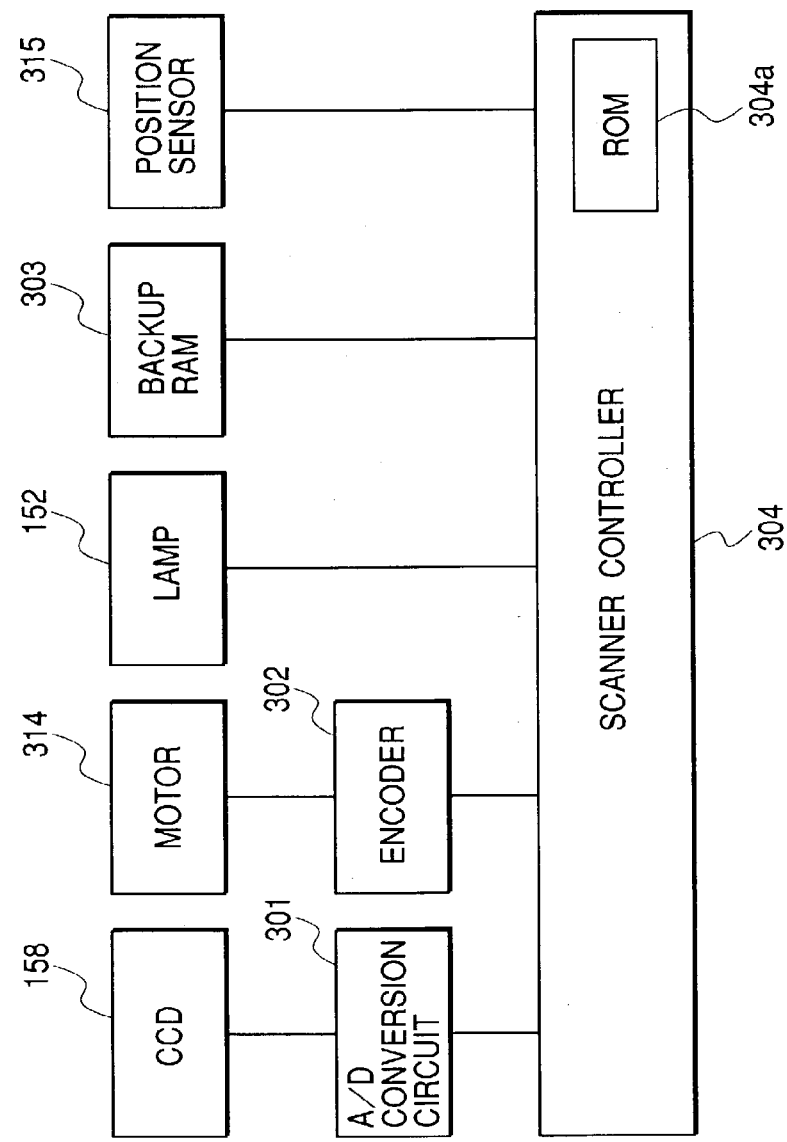
FIG. 3 is a control block diagram for the image reading apparatus.
Figure 4:
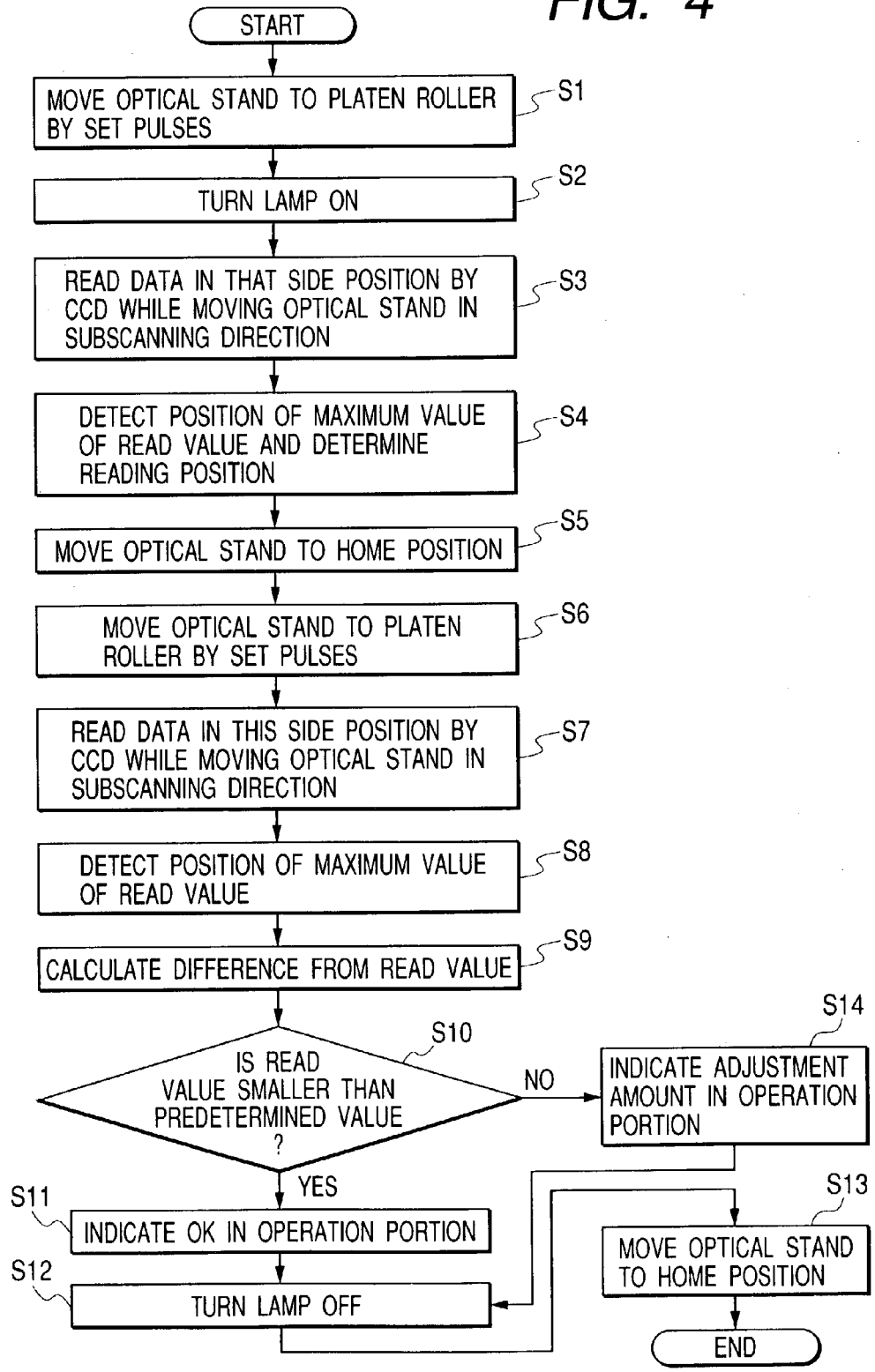
FIG. 4 is a flowchart illustrating a reading position detecting operation for the image reading apparatus.
Figure 5:
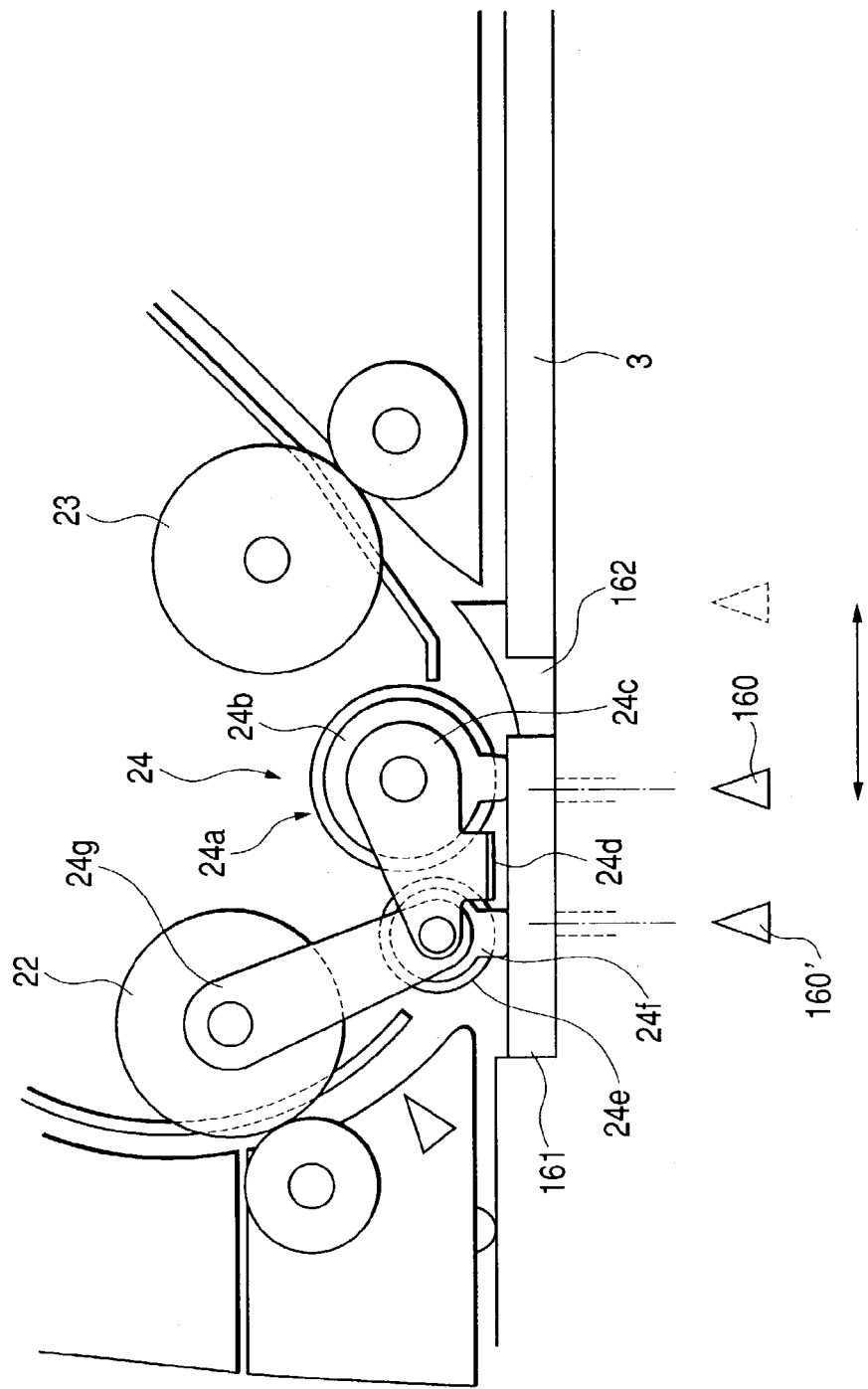
FIG. 5 is a detailed view of a portion of the image reading apparatus around an original reading position.
Figure 6:
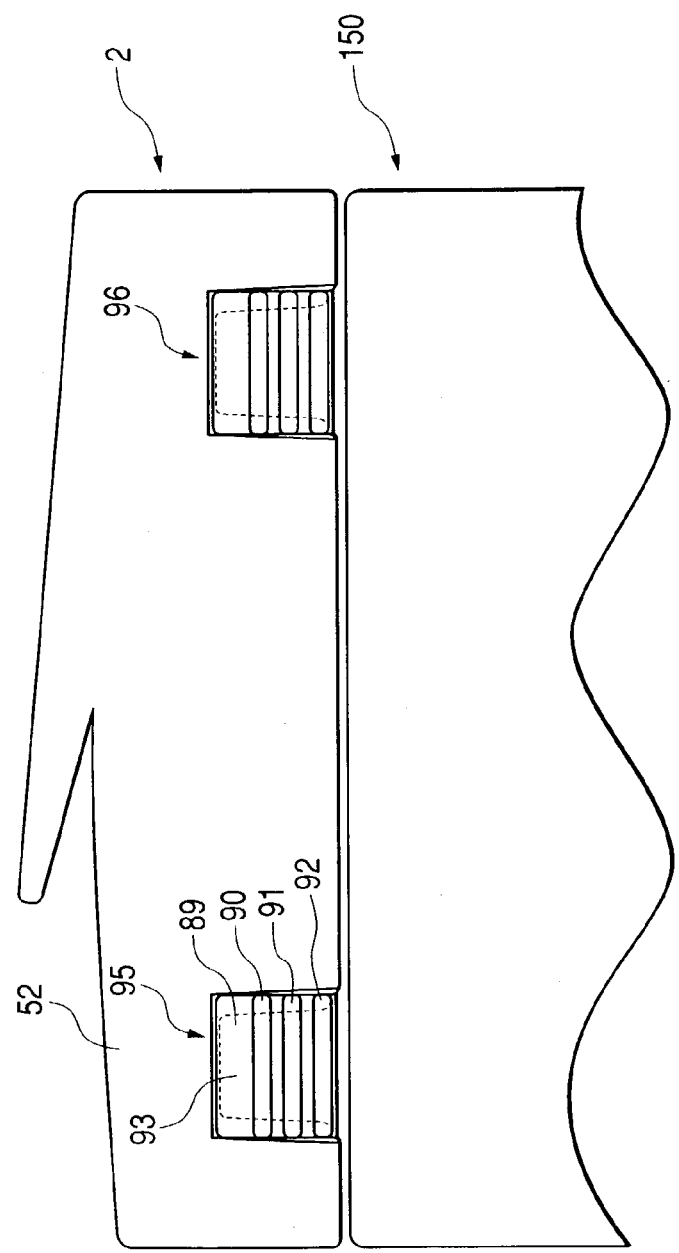
FIG. 6 is an explanatory rear view of a hinge mechanism of the image reading apparatus.
Figure 7:
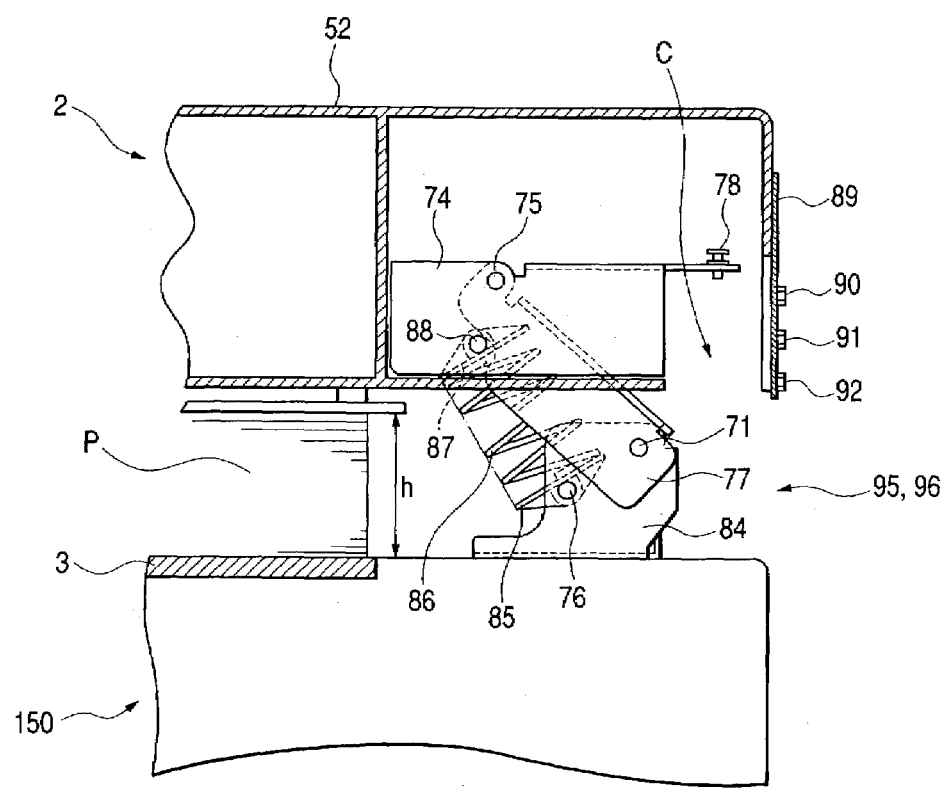
FIG. 7 is an explanatory diagram illustrating the hinge mechanism of the image reading apparatus.
Figure 8:
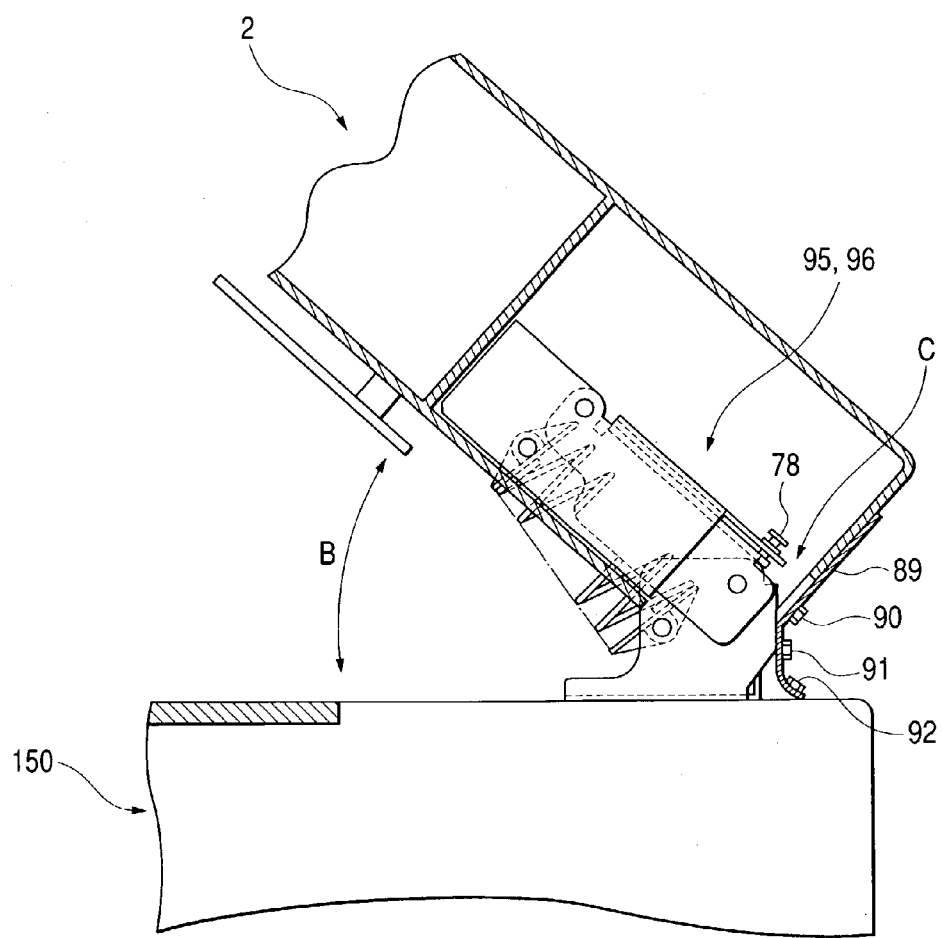
FIG. 8 is an explanatory diagram illustrating the hinge mechanism of the image reading apparatus.
Figure 9:
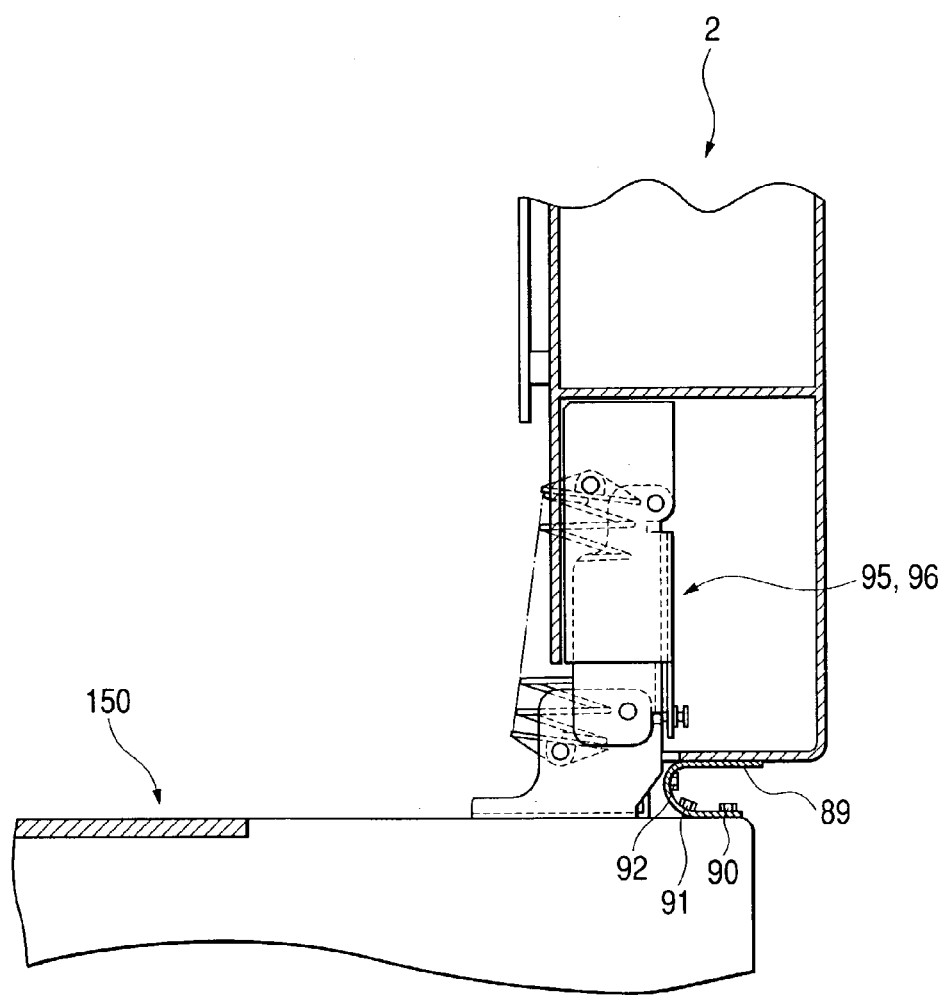
FIG. 9 is an explanatory diagram illustrating the hinge mechanism of the image reading apparatus.
Figure 10:
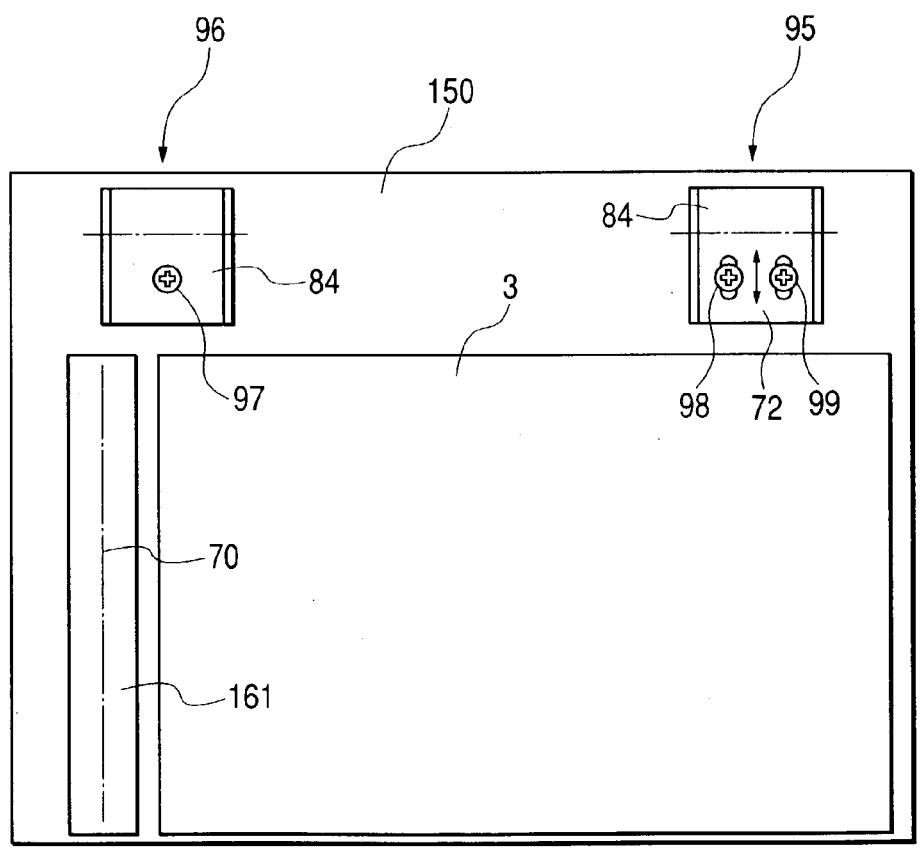
FIG. 10 is a plan view showing the portion of the image reading apparatus around the original reading position.
Figure 11:
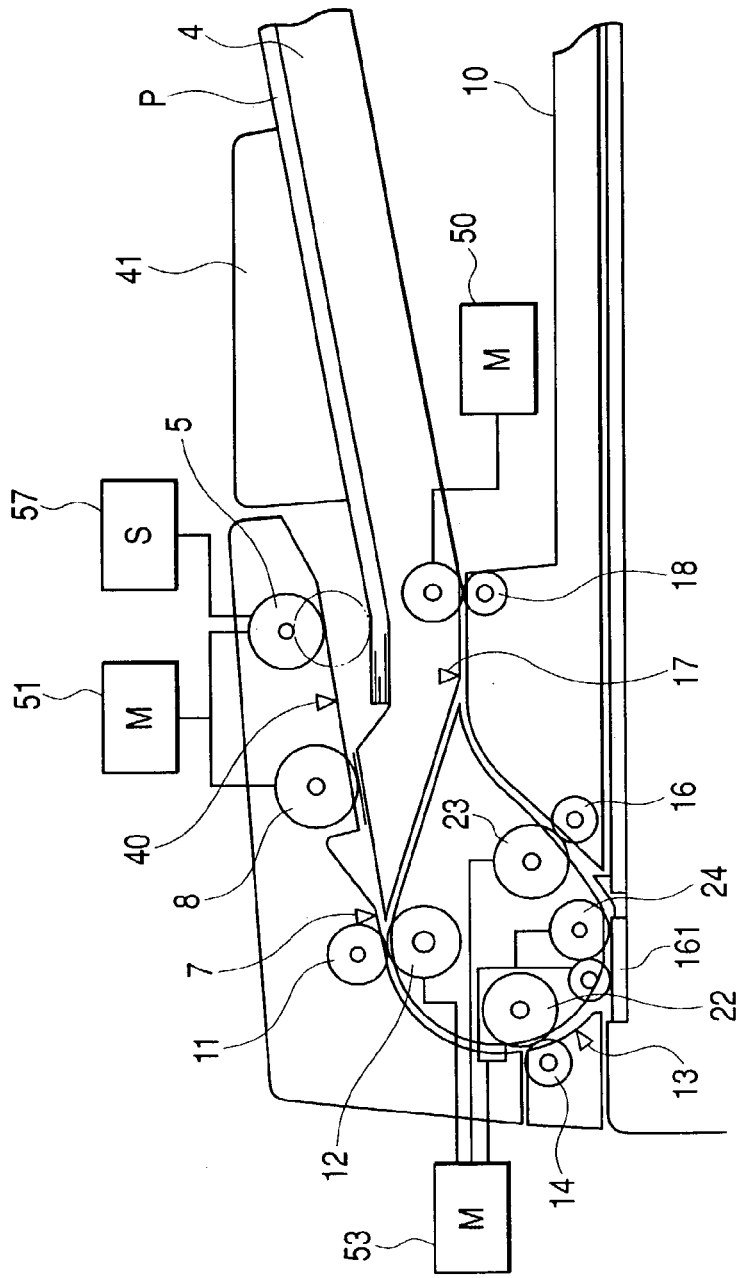
FIG. 11 is an explanatory diagram illustrating a driving system of the image reading apparatus.
Figure 12:
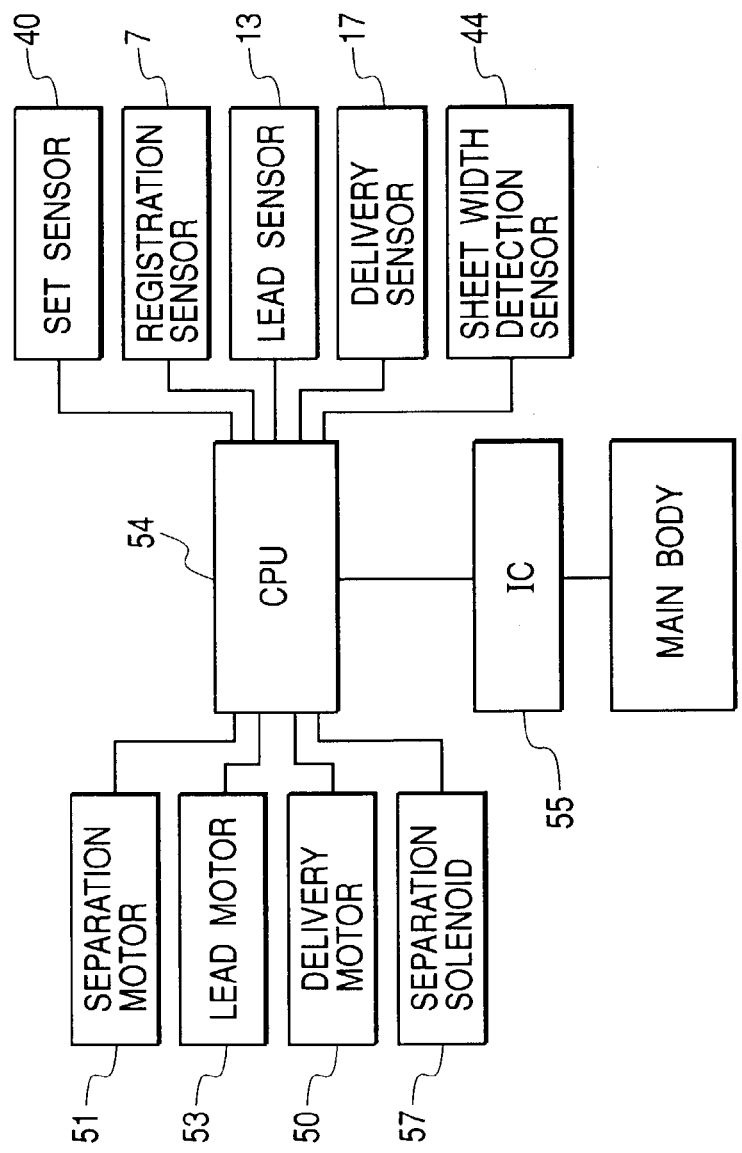
FIG. 12 is a control block diagram for the image forming apparatus.

An image reading apparatus according to an embodiment of the present invention and an image forming apparatus having this image reading apparatus in its main body will be described with reference to the drawings. FIG. 1 is a schematic diagram showing the construction of the image forming apparatus; FIG. 2 is a schematic diagram showing the construction of the image reading apparatus; FIG. 3 is a control block diagram for the image reading apparatus; FIG. 4 is a flowchart illustrating a reading position detecting operation for the image reading apparatus; FIG. 5 is a detailed view of a portion of the image reading apparatus around an original reading position; FIG. 6 is an explanatory view of a hinge mechanism of the image reading apparatus; FIG. 7 is an explanatory diagram illustrating the hinge mechanism of the image reading apparatus; FIG. 8 is an explanatory diagram illustrating the hinge mechanism of the image reading apparatus; FIG. 9 is an explanatory diagram illustrating the hinge mechanism of the image reading apparatus; FIG. 10 is a plan view showing the portion of the image reading apparatus around the original reading position; FIG. 11 is an explanatory diagram illustrating a driving system of the image reading apparatus; and FIG. 12 is a control block diagram for the image forming apparatus.

(Description of the Apparatus)

In FIG. 1, an original feeder (hereinafter referred to as ADF (auto document feeder)) 2 according to the present invention has in the upper portion thereof an original tray 4, and a delivery tray 10 is arranged below it. Originals P on the original tray 4 are separated and fed one by one starting with the uppermost one, the images of the originals being read during their transportation. When the reading of the images has been completed, the originals are delivered onto the delivery tray 10 and stacked thereon. The image forming apparatus 1 is formed by an image reading apparatus (hereinafter referred to as a reader portion 150) and an image output portion (hereinafter referred to as a printer portion 300).

(Description of the Reader Portion)

As shown in FIG. 2, the reader portion 150 has a lamp 152 for applying light to an original surface, and mirrors 153, 155, and 156 for guiding the reflected light from the original P corresponding to the light from the lamp 152 to a lens 157 and to a charge-coupled device (CCD) 158 serving as an image reading means. The lamp 152 and the mirror 153 are mounted to a first optical stand 159, and the mirrors 155 and 156 are mounted to a second optical stand 151.

Further, the optical stands 159 and 151 are connected to a motor 314 (See FIG. 3) by a wire (not shown), and are controlled to move in parallel with an original glass stand 3 (book platen) by the rotation of the motor 314.

A position sensor 315 is a sensor for detecting the home position of the first optical stand 159. By rotating the motor 314 in the forward and reverse directions with reference to the position of the position sensor 315, the optical stands 159 and 151 are moved to optically scan the original on the original glass stand 3.

Further, the motor 314 consists of a stepping motor. An encoder 302 (See FIG. 3) is connected to the motor 314. From the output of the encoder 302, it is possible to recognize by how many pulses the optical stands 159 and 151 have moved. That is, it is possible to grasp the positions of the optical stands 159 and 151 from the position sensor 315 and the encoder pulses from the encoder 302.

The reflected light from the original P is guided to the lens 157 by way of the mirrors 153, 155, and 156, and condensed on the CCD 158 by the lens 157. The CCD 158 effects photoelectric conversion on the reflected light reflecting the original information and outputs it as an electronic image signal.

In this construction, it is possible to read original information in two modes: an ADF original reading mode in which original information is read while transporting the original by the ADF 2, with the first optical stand 159 being at rest at an original reading position 160; and an original glass stand original reading mode in which original information is read while moving the optical stands 159 and 151 in the sub-scanning direction, with the original immovably placed on the original glass stand 3.

FIG. 3 is a block diagram schematically showing the construction of a reader control system. As shown in FIG. 3, the control system includes the lamp 152 for applying light to an original surface, the motor 314 for moving the optical stands 159 and 151 in the sub-scanning direction to scan the original, the CCD 158 for effecting photoelectric conversion on the reflected light from the original surface, an A/D conversion circuit 301 for performing A/D conversion on the output signal from the CCD 158, the encoder 302 connected to the motor 314, the lamp 152 for applying light to the original, the position sensor 315 for performing positioning on the optical stand 159 at the home position, a backup RAM 303 for setting the regular original reading position 160 in the ADF original reading mode, and a scanner controller 304. The scanner controller 304 includes a ROM 304a storing various programs such as the program corresponding to the flowchart of FIG. 4 described below.

The scanner controller 304 grasps the positions of the optical stands 159 and 151 on the basis of the encoder output and the output signal from the position sensor 315, adjusts the reading position by a means described below on the basis of the output signal of the CCD 158 digitized by the A/D conversion circuit 301, and stores the set position in the backup RAM 303.

Next, a processing for detecting the original reading position 160 and a processing for detecting the position of a platen roller 24 will be described with reference to the flowchart of FIG. 4. The scanner controller 304 first drives the motor 314 in accordance with the program stored in the ROM 304a to move the optical stands 159 and 151 in the direction of a platen glass plate 161 (See FIG. 2) as an original receiving member from the home position by previously set pulses and then stop them (step S1). The moving amount at this time is set such that the optical stand 159 is situated in the vicinity of the central position of the platen roller 24.

Next, the scanner controller 304 turns on the lamp 152 (step S2), and drives the motor 314 to thereby move the optical stands 159 and 151 through a predetermined range in the sub-scanning direction with,that point at the center. While doing so, it reads the signal output from the CCD 158 and converted to a digital signal by the A/D conversion circuit 301 (step S3). At the same time, it first stores, on that side in the main scanning direction, the position indicating the maximum value of the digital signal value in that range as well as the maximum value, and determines that position as the reading position (step S4). Then it moves again the optical stands 159 and 151 in the sub-scanning direction from the home position toward the platen roller by the set pulses (steps S5 and S6). Further, while moving the optical stands 159 and 151 in the sub-scanning direction, it stores, on this side in the main scanning direction, the position indicating the maximum value of the digital signal value in that range as well as the maximum value (steps S7 and S8).

The data on that side and the data on this side are compared (steps S9 and S10). When the value of the data on this side is smaller than a predetermined value, indication to the effect that there is no problem is made in an operating portion or the like (step S11), and the procedures are completed (steps S12 and S13). When the value of the data on this side is larger than the predetermined value, that is, when it is determined that the platen roller 24 of the ADF 2 is inclined more than a predetermined amount, an adjustment amount expressed numerically is indicated in the operating portion to give a warning to the effect that the platen roller 24 is to be adjusted to the parallel position again (step S14). This processing, in which the platen roller 24 directly undergoes reading and computation with no original placed, can be performed at any timing, e.g., at the time of installation of the ADF 2, at the time of turning on the power, or at the start of a job. Further, it is also possible to perform computation on the data on this side and that side in one reading.

Since the position and inclination of the platen roller 24 are detected, comparison of the data on this side and the data on that side suffices, and there is no particular limitations regarding the positions on this and that sides and the positional relationship.

(Description of the Printer Portion)

The printer portion 300 is image forming means using the well-known electrostatic latent image formation system. Referring to FIG. 1, the printer portion, which is the image output portion, will be described. Numeral 100 indicates an upper cassette, and the sheets in the cassette are separated and fed one by one to a registration roller 106 by the action of a separation claw and a feed roller 101. Numeral 102 indicates a lower cassette, and the sheets in the cassette are separated and fed one by one to the registration roller 106 by the action of a separation claw and a feed roller 103. Numeral 104 indicates a manual feed guide, by which sheets are separated and fed one by one to the registration roller 106 by way of a roller 105. Numeral 108 indicates a sheet stacking device (deck type), which is equipped with an inner plate 108*a* raised and lowered by a motor or the like. The sheets stacked on the inner plate are separated and fed one by one to a transport roller 110 by the action of a feed roller 109 and a separation claw.

A photosensitive drum 112, a developing device 114, a transfer charger 115, and a separation charger 116 form the image forming portion. Numeral 117 indicates a transport belt for transporting a sheet with an image formed thereon, numeral 118 indicates a fixing device, numeral 119 indicates a transport roller, and numeral 120 indicates a diverter. The sheet with an image formed thereon is guided to a delivery roller 121 by the diverter 120, and transported into a sorter 122. The sorter 122 has a non-sort tray 122*a*, a sort bin tray 122*b*, a non-sort tray delivery roller 122*c*, and a sort bin tray delivery roller 122*d*. The non-sort tray and the sort bin tray ascend and descend to sort the sheets by one stage. Instead of the sorter, a delivery tray may be provided.

In the case of duplex copying and multi-copying, the sheet which has undergone fixation is branched off by the diverter 120 and transported by the transport roller 201 before it is delivered onto an intermediate tray 200 by way of belts 202 and 204, a path 206, and a delivery roller 205. In the case of multi-copying, the sheet is delivered onto the intermediate tray 200 by the diverter 203. Numerals 209 and 210 indicate semicircular rollers for feeding sheets, numeral 211 indicates a separation roller pair, and numerals 213, 214, and 215 indicate transport rollers for transporting the sheets to the registration roller 106.

(Description of the Original Processing Device (ADF))

In the following, the original processing device (ADF) 2 will be described in detail with reference to FIG. 2.

(Description of the Original Tray Portion)

In FIG. 2, originals P in the shape of a sheet are stacked on the original tray 4. A pair of cross-direction regulation plates is arranged on the original tray 4 so as to be slideable in the cross direction of the original. The originals P stacked on the original tray 4 are regulated in the cross direction by the cross-direction regulation plates, whereby it is possible to secure stability in transport during feeding.

(Description of the Separating Portion)

A feed roller 5 is provided above the original tray 4. The feed roller 5 rotates with rotation of a separation transport roller 8 to feed sheet originals. Normally, the feed roller 5 is retreated in a home position (the upper position indicated by the solid line) so that it may not constitute an obstruction when the original is set. When feeding operation is started, it descends to the position indicated by the dotted line to abut against the upper surface of the original P. The feed roller 5, which is rotatably supported by an arm (not shown), is moved vertically by oscillating the arm.

A separation pad 6 is arranged opposite to the separation transport roller 8 and pressurizes the separation transport roller 8. The separation pad 6 is formed of a rubber material or the like with friction less than that of the separation transport roller 8. The originals P fed by the feed roller 5 are handled one by one and fed by the separation feed roller 8.

(Description of the Transport Portion)

A registration roller 12 and a registration driven roller 11 are registration means for putting the leading edges of the originals fed by the separating portion in order. The leading edges of the separated originals are caused to hit against a nip portion of the registration roller pair 11 and 12 that are at rest to loop the originals to thereby put the leading edges in order. Next, the originals are fed toward the platen glass plate 161 by a lead roller 22 and a lead driven roller 14 serving as supply rotary members. Further, the sheets are fed by a lead delivery roller 23 and a lead delivery driven roller 16 serving as delivery rotary members. Numeral 162 indicates a jump stand for scooping up the sheet from the platen glass plate 161. When image reading is completed, the original is delivered onto the delivery tray 10 by the delivery roller 18.

In the duplex copying mode, the sheet is not delivered by the delivery roller 18. Instead, it is switched back and guided to a sheet path situated above before it is transported toward the registration rollers 11 and 12. When the sheet reaches the registration rollers 11 and 12, the back side of the original is read in the same manner as described above.

(Description of the Original Reading Position)

In FIG. 5, on the opposite side of the platen glass plate 161 for reading, there is arranged a platen roller 24 forming a unit. The unit including the platen roller 24 includes a first platen roller 24*a* serving as a guide rotary member, a second platen roller 24*e* serving as a guide rotary member, a first oscillation arm 24*c* serving as an oscillating means, a second oscillation arm 24*g* serving as an oscillating means, a first abutment member 24*b*, a second abutment member 24*f*, a white plate 24*d*, an urging spring (not shown), a drive pulley, and a timing belt.

The first platen roller 24*a* and the second platen roller 24*e* are rotated at the same peripheral speed as that of the lead roller 22. The first platen roller 24*a* and the second platen roller 24*e* are rubber rollers with white surfaces, and even a thin original likely to be see-through is free from the influence of the roller surfaces during image reading.

The first abutment member 24b and the second abutment member 24f are respectively provided at both end shaft portions of the first platen roller 24a and the second platen roller 24e, and abut against the platen glass plate 161 to thereby ensure a gap. The dimension of the gap is approximately 0.15 to 0.5 mm. The dimension of the gap is determined where the regulation of the rise of the original and the transportability of the original are compatible with each other at the original reading position 160.

When the gap is 0.15 mm or less, a plunging shock will occur at the platen roller portion in the case of a thick original. Further, as a result of an increase in the transport load, unsteadiness in transport speed is generated, resulting in a blurred image.

When the gap is 0.5 mm or more, the original is raised at the original reading position 160, and variation in original position (with the original rising or not rising), unsteadiness in original transport speed, and fluctuation in luminance level occur during reading, resulting in a blurred image, a fogged image, or an image with unevenness. In this embodiment, the gap is set to 0.3 mm for both the first platen roller 24a and the second platen roller 24e.

The first oscillation arm 24c is rotatably provided at both end shaft portions of each of the second platen roller 24e and the first platen roller 24a. Further, the first platen roller 24a is urged toward the platen glass plate by an urging spring (not shown). The second oscillation arm 24g is rotatably provided at both end shaft portions of the lead roller 22. Further, the second platen roller 24e is urged toward the platen glass plate by the urging spring (not shown).

The white plate 24d is provided under the first oscillation arm 24c, and is spaced apart from and kept parallel to the platen glass plate 161 by the first abutment member 24b and the second abutment member 24f. Further, by securing a predetermined gap between the white plate 24d and the platen glass plate, it is possible to prevent deterioration in white level during image reading in the case of a thin sheet.

The original reading position 160 is set to be deviated to the left by a predetermined amount from the position directly below the first platen roller 24a. This setting is made taking into account the possible deviation of the original reading position 160; due to this setting, even when the reading position is deviated, it is possible to prevent the original reading position 160 from being shifted to the right of the position directly below the first platen roller 24a. When the reading position is shifted to the right of the platen roller, the original assumes a round transport locus, and is raised, resulting in a blurred image, a fogged image, etc. It is also possible to set the reading position to the position indicated at 160', that is, to a position deviated to the right by a predetermined amount from the position directly below the second platen roller 24e. In other words, the reading position can be set within the range between the positions 160 and 160'.

It can happen that toner, ink, or the like adhering to the surface of the original P being transported is separated therefrom and accumulated on the platen glass plate 161. When the dirt thus accumulated exists directly above the original reading position 160, it can happen that the dirt is taken for an image at the original reading position 160, and is erroneously recognized as a streaked image and read as such. However, since the gap between the sheet and the platen glass plate 161 is kept minimum by the first platen roller 24a and the second platen roller 24e, the accumulated dirt is automatically cleared away by being rubbed by the original transported (self-cleaning effect), and the region where the gap is small can be set wide, whereby generation of a streaked image can be prevented.

(Description of the Hinge Mechanism)

Referring to FIGS. 6 through 9, in order that the ADF 2 may be opened and closed with respect to the platen glass plate 161 and the original glass stand 3, hinge mechanisms 95 and 96 are provided in the reader portion 150. FIG. 6 is a rear view of the auto original feeder. A casing 52 contains right and left hinge mechanisms. As seen from the front side, a hinge mechanism 95 constitutes the right hinge and a hinge mechanism 96 constitutes a left hinge.

The hinge mechanisms 95 and 96 support the ADF 2 such that it can be opened and closed with respect to the reader portion 150 around hinge shafts 71. As shown in FIG. 7, each of the hinge mechanisms 95 and 96 includes a lift arm 74, a lift shaft 75, a lower spring shaft 76, a hinge arm 77, a height adjusting screw 78, a hinge shaft 71, a hinge base 84, a lower spring holder 85, a compression spring 86, an upper spring holder 87, an upper spring shaft 88, etc.

The hinge shaft 71 is supported by the hinge base 84. The hinge base 84 is fixed to the main body of the reader portion 150. Further, the hinge arm 77 is rotatably provided on the hinge shaft 71 such that it can oscillate (swing) with respect to the hinge base 84.

Further, the hinge arm 77 supports the lift arm 74 through the lift shaft 75. Thus, the lift arm 74 is rotatable with respect to the hinge arm 77. The height adjusting screw 78 is screwed into the lift arm 74. The distal end of the height adjusting screw 78 abuts against a part of the hinge arm 77, making it possible to adjust the height of the auto original feeder 2 with respect to the original glass stand 3.

The lift arm 74 is fixed to the casing 52 and supports the upper spring shaft 88. The upper spring shaft 88 is provided on the upper spring holder 87. The upper spring holder 87 retains one end of the compression spring 86. The lower spring holder 85 is provided on the lower spring shaft 76 and retains the other end of the compression spring 86.

The lower spring shaft 76 is fixed to the hinge base 84, so that as the ADF 2 is opened or closed, the distance between the upper spring shaft 88 and the lower spring shaft 76 varies, and the compression spring 86 is expanded or contracted.

A portion of the upper end of a hinge mechanism protecting cover 89 is fixed to the casing 52. The material of the hinge mechanism protecting cover 89 consists of an EPDM (ethylene propylene rubber) type rubber sheet, which is easy to form, elastic, and freely bendable. Further, it is restorable to its original form by its own weight.

Guard plates 90, 91, and 92 are obtained by molding of ABS (acrylonitrile-butadiene-styrene ternary copolymer) resin, and are fixed to the hinge mechanism protecting cover 89. Thus, even though it is subject to deformation, the hinge mechanism protecting cover 89 is not easily deformed or detached.

In both side portions of the casing 52 containing the hinge mechanisms 95 and 96, there are provided openings 93 in the form of cutouts in the casing 52 as indicated by the dash lines, which serve as a clearance when the ADF 2 is completely opened. The outer sides of the openings 93 are covered with the hinge mechanism protecting covers 89. Although FIG. 6 only shows the left-hand side opening, the right-hand side opening is of the same structure.

The hinge mechanism protecting covers 89 prevent intrusion of foreign matter into the interior of the hinges. Further, due to the provision of the guard plates 90, 91, and 92, the hinge mechanisms 95 and 96 are protected from damage even if an external force is applied thereto as a result of contact with a wall, a protrusion, or the like during transportation.

FIG. 7 shows a condition in which a thick original with a height h, e.g., a dictionary, is placed on the original glass stand 3. In this condition, the lift arm 74 rotates with respect to the hinge arm 77, and the white plate 24d and the auto original feeder 2 are equalized in parallel with the book platen 3. At this time, the compression spring 86 is compressed, aiding the opening of the ADF 2.

FIG. 8 shows a condition in which the ADF 2 is half open. In this condition, the ADF 2 can be opened and closed in the directions of arrows B with respect to the image forming apparatus 1.

FIG. 9 shows a condition in which the auto original feeder 2 is completely open. At this time, the compression spring 86 is expanded. Thus, the ADF 2 can be closed with a small force. In this way, as the ADF 2 is opened or closed, the compression springs 86 of the hinge mechanisms 95 and 96 are expanded or contracted to thereby aid the opening and closing of the ADF 2.

(ADF Position Adjustment)

Image squareness adjustment is performed, with the ADF 2 inclined with respect to the reader portion 150. FIG. 10 shows a portion around the upper surface of the reader portion 150. To mount the ADF 2, the hinge bases 84 constituting the bases of the hinge mechanisms 95 and 96 of the ADF 2 are joined to the upper surface of the reader portion 150. The left-hand side hinge mechanism 96 is secured in position by a screw 97. Regarding the right-hand side hinge mechanism 95, the hinge base 84 is mounted by using elongated holes, so that the hinge mechanism 95 can be moved to allow the vertical adjustment with respect to the reader portion 150 as indicated by the arrows in FIG. 10.

Due to this arrangement, the ADF 2 can be inclined around the mounting screw 97 for the left-hand side hinge 96, so that the ADF 2 can be fixed in position in an adjusted state in which the main scanning line 70 of the reader portion 150 and the original feeding direction of the ADF are perpendicular to each other. Due to the adjustment to the perpendicular positional relationship, there is no danger of the original being read obliquely, so that no distorted image is read.

(Description of the Driving System)

FIG. 11 shows a driving system consisting of a motor and solenoids for driving the rollers, etc. A separation solenoid 57 oscillates the feed roller 5. The separation solenoid 57 is a keeping solenoid, which raises the feed roller 5 to a home position (the upper position indicated by the solid line) and retains it there so that it may not constitute an obstruction when the original is set. When feeding operation is to be performed, the keeping power of the separation solenoid 57 is turned off to lower the feed roller 5 until the feed roller 5 is brought into pressure contact with the uppermost one of the sheet originals on the original tray 4. A separation motor 51 is a stepping motor, which rotates the separation transport roller 8 and the feed roller 5 in the transport direction.

A lead motor 53 is a stepping motor, which drives the registration roller 12, the lead roller 22, the platen roller 24, and the lead delivery roller 23. The rollers are driven at the speed at which the image of the original being transported is read. A delivery motor 50 is a stepping motor for driving the delivery roller 18.

(Description of the Sensors)

Provided on the original tray 4 is a set sensor 40, which is a transmission optical sensor for detecting a sheet original P set on the original tray 4. Further, provided below the original tray 4 is a sheet width detection sensor 44 for detecting the length in the cross direction of the original stack P set on the original tray 4 by detecting the position of a side guide 41.

Between the separation roller 8 and the registration roller 12, there is provided a registration sensor 7, which is a transmission optical sensor for detecting an original. It detects the leading edge of an original separated and fed and the timing with which the hit amount (loop amount) by which the original hits against the registration roller 12 is controlled. Immediately after a lead roller 22, there is provided a lead sensor 13, which is a reflection optical sensor for detecting an original, providing a reference signal for the timing with which image reading is started at the original reading position 160. Immediately before the delivery roller 18, there is provided a delivery sensor 17, which is a transmission optical sensor for detecting an original, detecting the timing with which the original is delivered, etc.

(Description of the Feeding Operation)

When an original P on the original tray 4 is detected by the set sensor 40, the feed roller 5 descends and abuts against the original stack. When the copying conditions are entered in the operating portion of the copying machine and the start key is depressed, the original size is detected by the sheet width detection sensor 44 on the original tray 4. Further, the retention of the separation solenoid 57 is canceled, and the originals P advance to the downstream portion by the feeding force of the feed roller 5. Next, the originals P from the original tray 4 are transported one by one to the downstream portion.

The leading edges of the originals P having passed the separation portion are put in order by the registration roller 12, and the originals are transported by the registration roller 12. Each original whose leading edge has reached the lead roller 22 is transported toward the platen glass plate 161, and image reading is performed at the original reading position 160 while the original is being transported by the platen roller 24 and the lead delivery roller 23. When the image reading is completed, the original is stacked on the delivery tray 10 by the delivery roller 18.

In the duplex copying mode, the original is not delivered by the delivery roller 18. Instead, it is switched back and guided to the sheet path above to be transported to the registration rollers 11 and 12. When the original has reached the registration rollers 11 and 12, the back side of the original is read in the same manner as described above.

(Description of the Control Circuit)

FIG. 12 is a block diagram showing the circuit configuration of the control device for the ADF 2 of this embodiment. A microprocessor (CPU) 54 constitutes the central component of the control circuit. Connected to the input/output ports of the CPU 54 are drive circuits of various loads and sensor signals. Further, the control circuit is equipped with a RAM backed up by a battery (not shown) and a ROM storing a control sequence software program. Numeral 55 indicates a communication IC for controlling the data communication with the image forming apparatus.

A separation motor 51, a lead motor 53, and a delivery motor 50 are driven by the respective stepping motor drivers. A mutual excitation signal and a motor current control signal are input to each driver from the CPU 54. A separation solenoid 57 is driven by a driver, and its operation is controlled by a signal connected to the input/output ports of the CPU 54.

Various sensors, such as a registration sensor 7, a set sensor 40, a lead sensor 13, a delivery sensor 17, and a sheet width detection sensor 44, are connected to the input/output ports of the CPU 54 and are used to monitor the behavior of originals and the behavior of movable loads in the apparatus.

Another Embodiment

Figure 13:
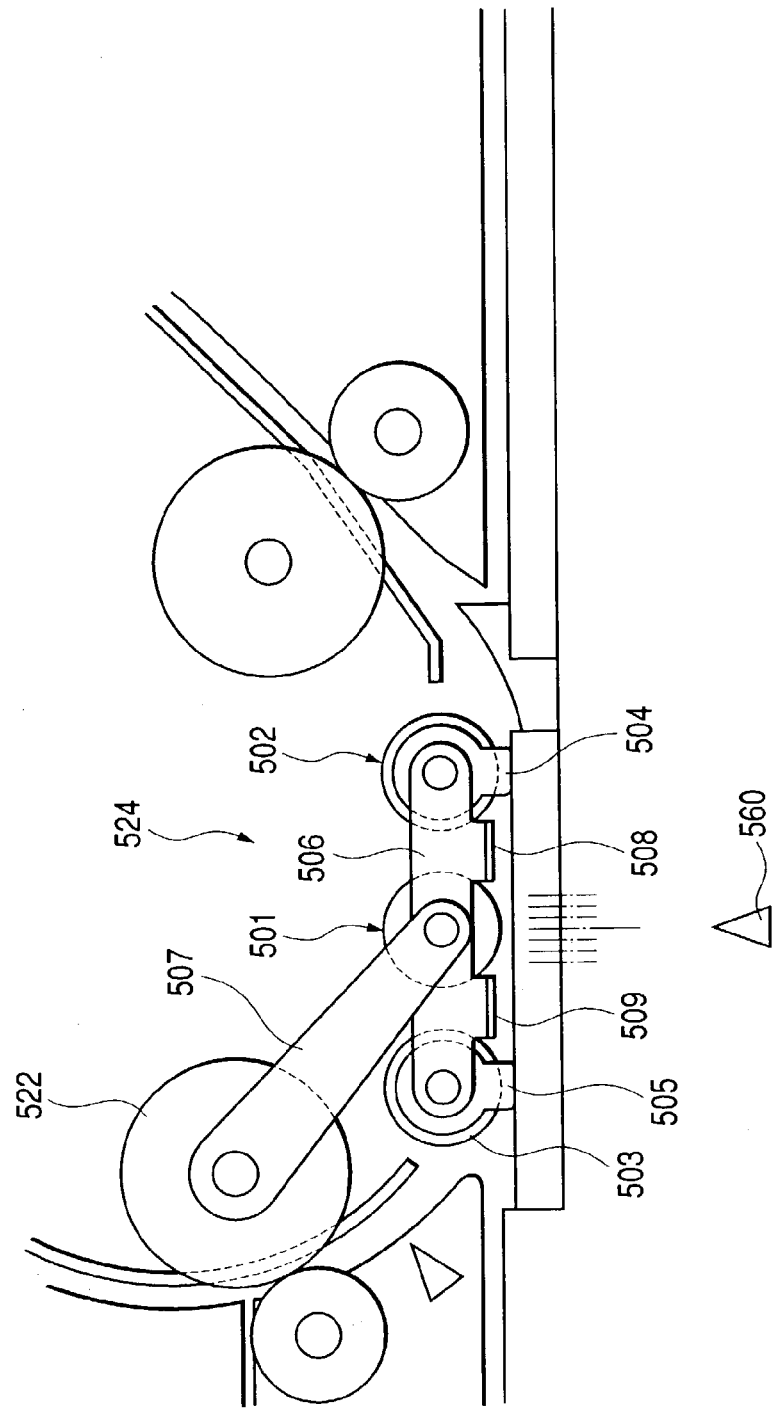
FIG. 13 is a detailed diagram showing the portion of an image reading apparatus according to another embodiment around an original reading position.
Figure 14A:
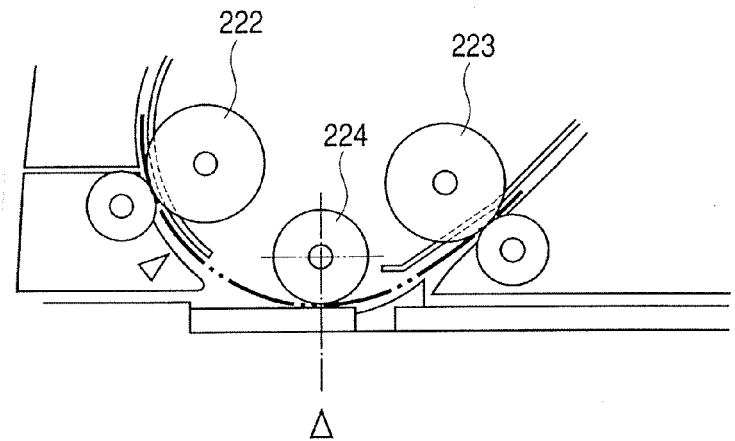
FIGS. 14A, 14B, and 14C are explanatory diagrams showing a conventional image reading apparatus.
Figure 14B:
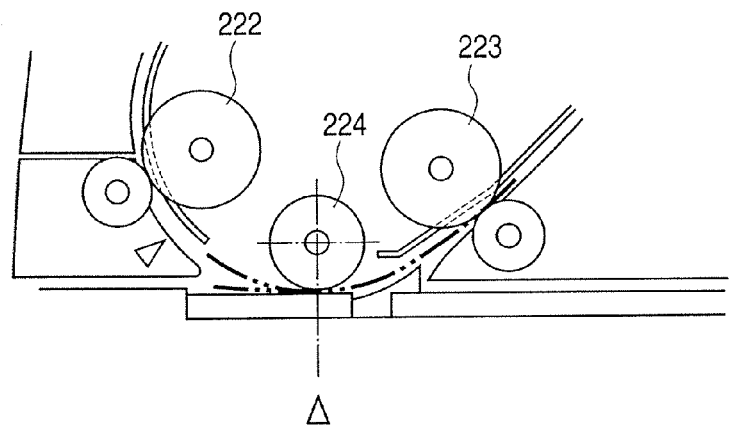
Figure 14C:
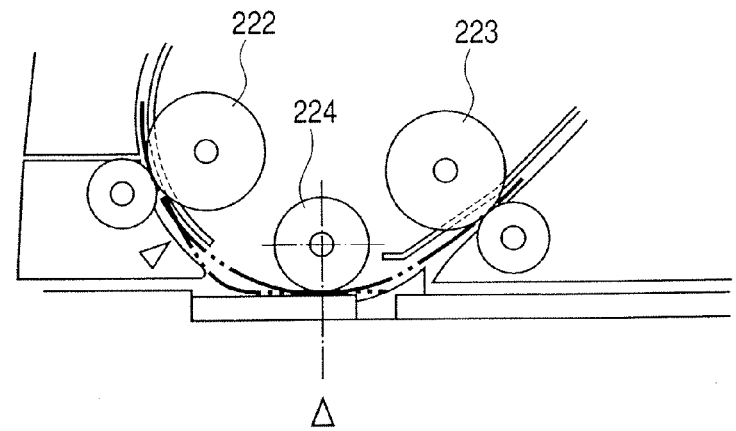

FIG. 13 shows another embodiment, in which a platen roller unit 524 is opposed to the platen glass plate 161 for reading. The platen roller unit 524 includes a platen roller 501 as a guide rotary member, an inlet roller 503 as a guide rotary member, a delivery roller 502 as a guide rotary member, a first oscillation arm 506 as an oscillating means, a second oscillation arm 507 as an oscillating means, a first abutment member 504, a second abutment member. 505, white plates 508 and 509, an urging spring (not shown), a driving pulley, and a timing belt.

The platen roller 501, the inlet roller 503, and the delivery roller 502 are rotated at the same peripheral speed as that of a lead roller 522. The inlet roller 503 and the delivery roller 502, which serve to regulate originals, may be driven rollers. The platen roller 501 is a rubber roller with a white surface, and even a thin original likely to be see-through is free from the influence of the roller surface during image reading.

The first and second abutment members 504 and 505 are respectively provided at both shaft ends of each of the delivery roller 502 and the inlet roller 503. They abut against the platen glass plate 161 to thereby secure a gap. The platen roller 501, the inlet roller 503, and the delivery roller 502 are preferably spaced apart from the platen glass plate by approximately 0.15 to 0.5 mm. The dimension of the gap is determined where the regulation of the rise of the original and the transportability of the original are compatible with each other at the original reading position 560. In this embodiment, the gap dimension for the platen roller 501 at the original reading position 560 is 0.3 mm. For the inlet roller 503 and the delivery roller 502, the gap is set to 0.5 mm from the viewpoint of securing transportability for the original since, at these rollers, the original is transported from above or while being upwardly bent. The first oscillation arm 506 is rotatably provided at either end of the shaft of each of the platen roller 501, the inlet roller 503, and the delivery roller 502.

The second oscillation arm 507 is rotatably provided at either end of the shaft of each of the lead roller 522 and the platen roller 501. Further, the platen roller 501, the inlet roller 503, and the delivery roller 502 are urged toward the platen glass plate by an urging spring (not shown).

The white plates 508 and 509 are provided under the first oscillation arm 506. They are kept spaced apart from and parallel to the platen glass plate by the first and second abutment members 504 and 505. Further, by arranging the white plates so as to be spaced apart from the platen glass plate by a predetermined gap, a deterioration in white level during image reading in the case of a thin sheet is prevented.

The original reading position 560 is set directly below the platen roller 501. Any fluctuation in the reading position as indicated by the broken lines does not lead to undesired generation of a blurred image, a fogged image, or the like since the original is transported horizontally with respect to the platen glass plate by the inlet roller 503 and the delivery roller 502.

As described above, according to the present invention, there are provided between the supply rotary member and the delivery rotary member a plurality of guide rotary members which guide the original while keeping it spaced apart from the original receiving member by a predetermined gap, whereby it is possible to keep a horizontal transport attitude for the original, thereby making it possible to maintain the requisite level of accuracy for the original reading position. Further, the distance between the guide rotary member situated most upstream with respect to the original transporting direction among the guide rotary members and the original receiving member is minimum, whereby any dirt accumulated is automatically rubbed away by the originals as they slide by while being transported (self-cleaning effect), thereby preventing generation of a streaked image, etc.

What is claimed is:

1. An image reading apparatus comprising:
   a supply rotary member for supplying an original;
   a transparent original receiving member for receiving the original supplied from the supply rotary member;
   an image reader for reading an image of the original through the transparent original receiving member;
   a delivery rotary member for delivering the original after the image of the original is read;
   a plurality of guide rotary members for guiding the original while keeping the original spaced apart from the original receiving member by a predetermined distance, the plurality of guide rotary members being disposed between the supply rotary member and the delivery rotary member and above the original receiving member; and
   a plurality of abutment members for maintaining a predetermined distance between the original receiving member and the plurality of guide rotary members, the abutment members being disposed at axes of at least two of the plurality of guide rotary members.

2. The image reading apparatus according to claim 1, wherein
   the plurality of guide rotary members consist of two guide rotary members,
   each of the two guide rotary members is provided with oscillation means, and
   the plurality of abutment members maintain the predetermined distance between the original receiving member and the two guide rotary members.

3. The image reading apparatus according to claim 2, wherein a white plate is provided between the two guide rotary members.

4. The image reading apparatus according to claim 2, wherein an original reading position of the image reader is set to be between the two guide rotary members and in the vicinity of the guide rotary members.

5. The image reading apparatus according to claim 1, wherein
   the plurality of guide rotary members consist of three guide rotary members arranged successively in an original transporting direction,
   the three guide rotary members are equipped with a plurality of oscillation means for retaining the three guide rotary members, and
   the plurality of abutment members are disposed at least two of the three guide rotary members.

6. An image forming apparatus for forming an image on the basis of information from an image reading apparatus for reading the image of an original, wherein the image reading apparatus is the image reading apparatus according to claim 1.

* * * * *

UNITED STATES PATENT AND TRADEMARK OFFICE
CERTIFICATE OF CORRECTION

| | |
|---|---|
| PATENT NO. | : 7,196,827 B2 |
| APPLICATION NO. | : 10/310054 |
| DATED | : March 27, 2007 |
| INVENTOR(S) | : Yamanaka |

It is certified that error appears in the above-identified patent and that said Letters Patent is hereby corrected as shown below:

On the cover page,

Item [*] Notice: Subject to any disclaimer, the term of this patent is extended or adjusted under 35 USC 154(b) by 1006 days Delete the phrase "by 1006 days" and insert -- by 1063 days--

Signed and Sealed this

Thirty-first Day of July, 2007

JON W. DUDAS
*Director of the United States Patent and Trademark Office*

UNITED STATES PATENT AND TRADEMARK OFFICE
CERTIFICATE OF CORRECTION

PATENT NO. : 7,196,827 B2  Page 1 of 1
APPLICATION NO. : 10/310054
DATED : March 27, 2007
INVENTOR(S) : Yuji Yamanaka It is certified that error appears in the above-identified patent and that said Letters Patent is hereby corrected as shown below:

COLUMN 12:
Line 59, "at least" should read --at axis of at least--.

Signed and Sealed this

Eleventh Day of December, 2007

JON W. DUDAS
*Director of the United States Patent and Trademark Office*